Dec. 2, 1958        F. J. McNULTY        2,862,538
SAFETY TUBELESS PNEUMATIC TIRE VEHICLE WHEEL
Filed Oct. 16, 1956        2 Sheets-Sheet 1
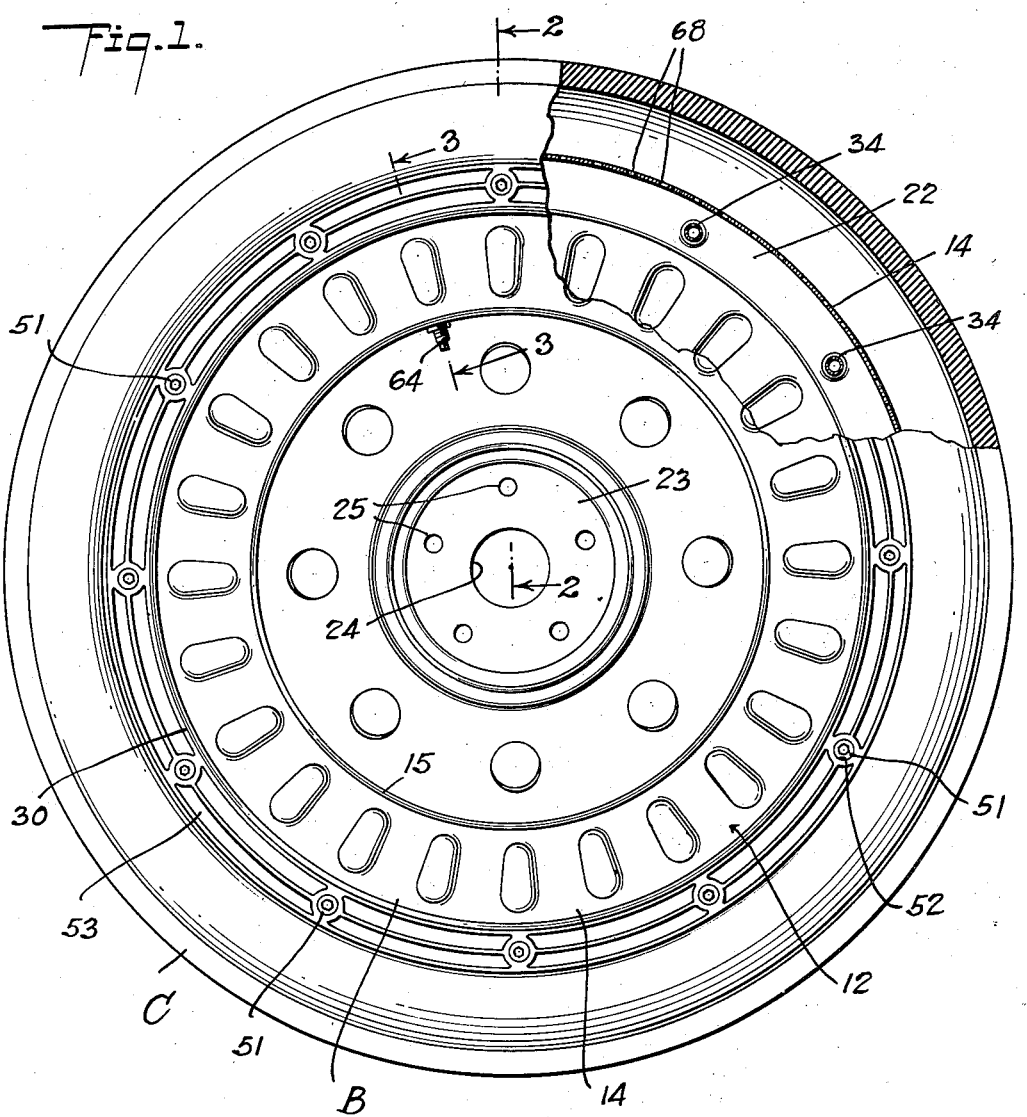
INVENTOR.
FRANK J. McNULTY
BY
Frederick Diehl
ATTORNEY

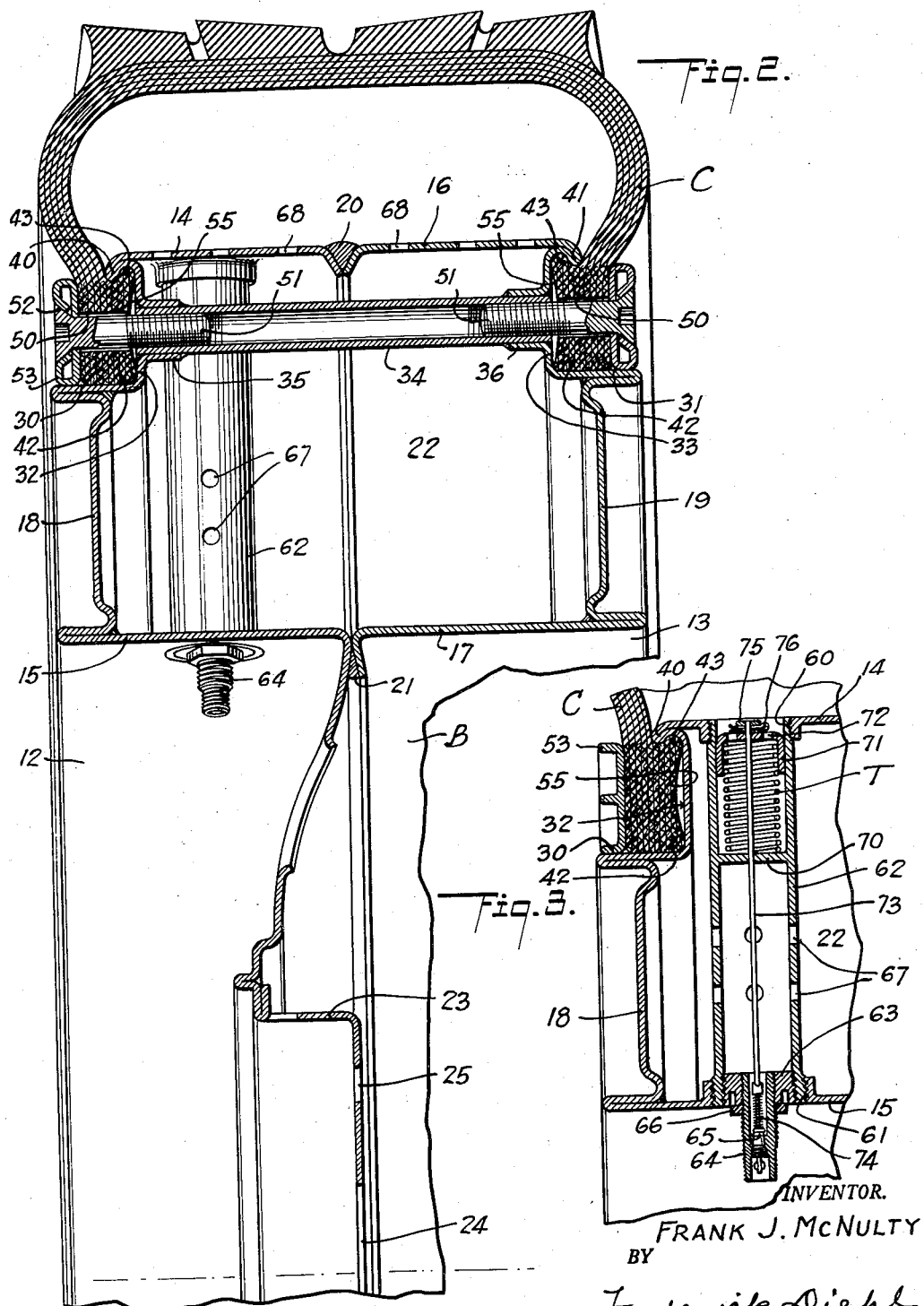

United States Patent Office 2,862,538
Patented Dec. 2, 1958

2,862,538

SAFETY TUBELESS PNEUMATIC TIRE VEHICLE WHEEL

Frank J. McNulty, Los Angeles, Calif.

Application October 16, 1956, Serial No. 616,176

5 Claims. (Cl. 152—10)

My present invention relates to vehicle wheels of the general character embodied in my United States Letters Patent No. 2,344,362, issued March 14, 1944.

My patent above identified discloses a vehicle wheel having a tubeless pneumatic tire of generally U-shaped cross section whose side wall forming portions are detachably secured and safely locked in fluid sealed relation to the side walls of the wheel body by co-acting means on the wheel body and on retaining ring members to form a flexible walled pneumatic chamber to which compressed air is supplied to inflate the tire to a predetermined pressure.

An object of my present invention is to provide a safety tubeless pneumatic tire vehicle wheel which is characterized by the structural simplicity and positive operation of its means which detachably secures the tire casing of generally U-shaped cross section to the side wall forming portions of the wheel body in fluid sealing engagement with absolute security against leakage of air and mechanical displacement.

Another object of my invention is to provide a safety tubeless pneumatic tire vehicle wheel of the above described character in which an annular compartment in the wheel body which is in communication with the interior of the tire casing, co-acts therewith to receive a relatively large volume of air at a low pressure for riding comfort and provide a rigid supporting surface which will be engaged by the casing should the latter become entirely deflated from a puncture or a blowout, all in such manner as to support the vehicle in only a slightly lowered position at the wheel whose tire has been deflated, whereby to preclude if not entirely prevent loss of control of the vehicle should a tire blowout occur.

A further object of my invention is to provide a safety tubeless pneumatic tire vehicle wheel embodying an inlet valve past which air under pressure is forced into the tire to inflate same, and with which is associated a thermo-responsive device operable automatically to open the valve should air in the tire become excessively heated from high road speeds, high atmospheric temperature or other conditions which cause a sufficient increase in air pressure to endanger the structure of the tire with the attendant possibility of a blowout, whereby to provide a vital safety factor against tire failure.

With these and other objects in view, my invention resides in the combinations, arrangements and functional relationships of elements as set forth in the following specification and particularly pointed out in the appended claims.

In the accompanying drawings,

Figure 1 is a view in side elevation partly in section, of one form of safety tubeless pneumatic tire vehicle wheel embodying my invention;

Figure 2 is an enlarged diametric sectional view taken on the line 2—2 of Figure 1; and Figure 3 is a fragmentary transverse sectional view taken on the line 3—3 of Figure 1.

Referring specifically to the drawings my invention in its illustrated embodiment broadly comprises a body B, a tire casing C and a thermo-responsive device T. The body B which is constructed of sheet metal, is composed of an outer annular section 12 and an inner annular section 13. The sections 12 and 13 are constructed to provide radially spaced annuli 14, 15 and 16, 17, respectively, connected by web portions 18 and 19, respectively, and have their annuli welded together fluid-tight at 20 and 21 to form an annular air chamber 22 as clearly shown in Figure 2. The annuli 14 and 16 co-act to form the rim of the body B receiving the casing C to mount the casing on the body in a manner to be later fully described.

The outer section 12 has a hub portion 23 provided with a central opening 24 for the axle of the wheel (not shown) and a circular series of openings 25 freely receiving the usual cap screws to demountably support the wheel body on the hub of the axle as will be clear to those skilled in the art.

The web portions 18 and 19 are recessed to provide annular peripheral seats 30 and 31, respectively, and annular radial abutments 32 and 33, respectively, which are rigidly connected at circumferentially spaced intervals by tubular spacers 34 welded to sleeves 35 and 36 projecting from the confronting sides of the respective abutments 32 and 33, all as shown in Figures 2 and 3.

At the junction of the abutments 32 and 33 and the respective rim-forming annuli 14 and 16, are annular hooks 40 and 41, respectively, which project radially inward towards the annular seats 30 and 31, respectively. The wire mesh reinforced bead portions 42 of the casing C are formed to rest against the annular seats 30 and 31 and are provided with annular hooks 43 directed oppositely with respect to the hooks 40, 41 so as to be interengageable with the latter.

At circumferentially spaced locations to register with the tubular spacers 34, the bead portions 42 are provided with openings 50 for flat head clamping screws 51 which are of the Allen type and are passed through identically spaced and beveled openings 52 in clamping rings 53 and threaded into the spacers 34. It will be noted from Figures 2 and 3 that the inner radial faces of the bead portions 42 are concave or dished as indicated at 55 so that as the screws 51 are tightened the bead portions 42 will be displaced or spread radially between the seats 30, 31 and the rim hooks 40, 41 so as to force the hooks 43 into fluid sealing engagement with the hooks 40, 41 and to securely lock the casing C on the body B.

As clearly shown in Figure 3 the annuli 14 and 15 of the outer body section 12 are provided with co-axially related screw threaded openings 60 and 61, respectively, into which a barrel 62 is screwed. Into the internally threaded end of the barrel is screwed a plug 63. Screwed through the plug 63 so as to be mounted therein is the outer end portion of a conventional valve stem 64 constituting an air inlet and into which is screwed a conventional tire valve 65. The stem 64 is locked in fixed position by a nut 66.

Air under pressure to inflate the casing C is forced past the valve 65 into the barrel 62 and from the latter through openings 67 in the barrel wall into the chamber 22 from which the air is free to flow into the casing C through openings 68 in the annuli 14 and 16 of the body sections 12 and 13. It will be clear from Figure 2 that the annuli 14 and 16 co-act to provide a rigid, flat supporting surface constituting a rim which will be engaged by the casing should the latter be punctured and become deflated, all so as to support the vehicle at the wheel in only a slightly lowered position from that at which it is supported by the tire when fully inflated, to thus materially aid the operator in maintaining control of the vehicle should a blowout occur.

The thermo-responsive device T is in the form of a bi-metallic helical coil mounted in the inner end of the barrel 62 between a partition 70 and a cup shaped cap 71 having perforations 72 in the top thereof. The cap 71 is operatively connected to the tire valve 65 by a rod 73 secured at one end to the pin 74 of the valve 65, and passing through the partition 70, element T, cap 71 and a stop collar 75 which is secured to the rod by a cotter pin 76 so as to bear against the cap and confine the element T under a predetermined compression or loading in the closed position of the valve 65.

Should the air in the casing become heated excessively from high road speed, high atmospheric temperature or other adverse condition and cause a sufficient increase in the air pressure to endanger the structure of the casing with the possibility of a blowout, the resulting axial expansion of the element T will exert a pull upon the rod 73 and open the valve 65, to thus vent the casing to atmosphere and relieve it of the excess pressure.

I claim:

1. A safety tubeless pneumatic tire vehicle wheel comprising: a wheel body having a rim provided with annular abutments at opposite sides extending in a radially inward direction, and annular peripheral seats projecting laterally outward from said abutments; a tire casing having bead portions engaging said seats and abutments; said rim and bead portions having annular hooks oppositely extending radially to interengage; and fastening means co-acting with said wheel body and bead portions to detachably secure said casing to the body with said hooks locking the casing on the body; said bead portions having means responsive to tightening of said fastening means to spread said bead portions radially between said seats and rim hooks so as to force said hooks into fluid sealing interengagement.

2. A safety tubeless pneumatic tire vehicle wheel comprising: a wheel body having a rim provided with annular abutments at opposite sides extending in a radially inward direction, and annular peripheral seats projecting laterally outward from said abutments; a tire casing having bead portions engaging said seats and abutments; said rim and bead portions having annular hooks oppositely extending radially to interengage; and means including fastening members co-acting with said wheel body and bead portions to detachably secure said casing to the body; the sides of said bead portions confronting the respective abutments being recessed for co-action with the abutments in spreading the bead portions in a radial direction between said seats and rim hooks when said fastening members are tightened, so as to force said hooks into fluid sealing relationship and lock the casing to the body.

3. A safety tubeless pneumatic tire vehicle wheel comprising: a wheel body having a rim provided with annular abutments at opposite sides extending in a radially inward direction, and annular peripheral seats projecting laterally outward from said abutments; a tire casing having bead portions engaging said seats and abutments; said rim and bead portions having annular hooks oppositely extending radially to interengage; spacers rigidly connecting said abutments; continuous clamping rings mounted on said seats and engaging said bead portions; and headed cap screws extending through said rings, bead portions and abutments and screw threaded into said spacers to lock the casing on said body with said hooks in fluid sealing relationship.

4. A safety tubeless pneumatic tire vehicle wheel comprising: a wheel body having a rim provided with annular abutments at opposite sides extending in a radially inward direction, and annular peripheral seats projecting laterally outward from said abutments; a tire casing having bead portions engaging said seats and abutments; said rim and bead portions having annular hooks oppositely extending radially to interengage; spacers rigidly connecting said abutments; continuous clamping rings mounted on said seats and engaging said bead portions; and headed cap screws extending through said rings, bead portions and abutments and screw threaded into said spacers; said bead portions having recessed faces confronting the respective abutments for co-action with same when said screws are tightened, to spread the bead portions in radial directions between said seats and rim hooks, whereby to force said hooks into fluid sealing relationship and lock the casing to the body.

5. A safety tubeless pneumatic tire vehicle wheel comprising: a wheel body composed of an outer annular section and an inner annular section each of which is constructed to provide radially spaced annuli connected by a web portion, with the respective annuli of said sections being secured together fluid-tight to form an annular air chamber the periphery of which forms a rigid, flat supporting surface constituting a rim having openings therethrough, said web portions having annular peripheral seats; a tire casing having bead portions mounted on said seats; and means including fastening members co-acting with said bead portions and sections to secure the casing to the body with the casing and said rim co-acting when the tire is inflated, to define an air space in communication with said air chamber through said rim openings; and valve means through which air under pressure can be supplied to said chamber to inflate the casing.

References Cited in the file of this patent

UNITED STATES PATENTS

| 921,174 | Snyder | May 11, 1909 |
| 1,903,575 | Shoemaker | Apr. 11, 1933 |
| 2,344,362 | McNulty | Mar. 14, 1944 |
| 2,461,257 | Brandon | Feb. 8, 1949 |
| 2,776,798 | Mueller et al. | Jan. 8, 1957 |